Jan. 11, 1949.  R. H. WINTERS  2,458,887
BAR SCREEN GRADER FOR CARROTS AND VEGETABLES
HAVING LIKE TAPERING FORMS
Filed Feb. 11, 1947  4 Sheets-Sheet 1
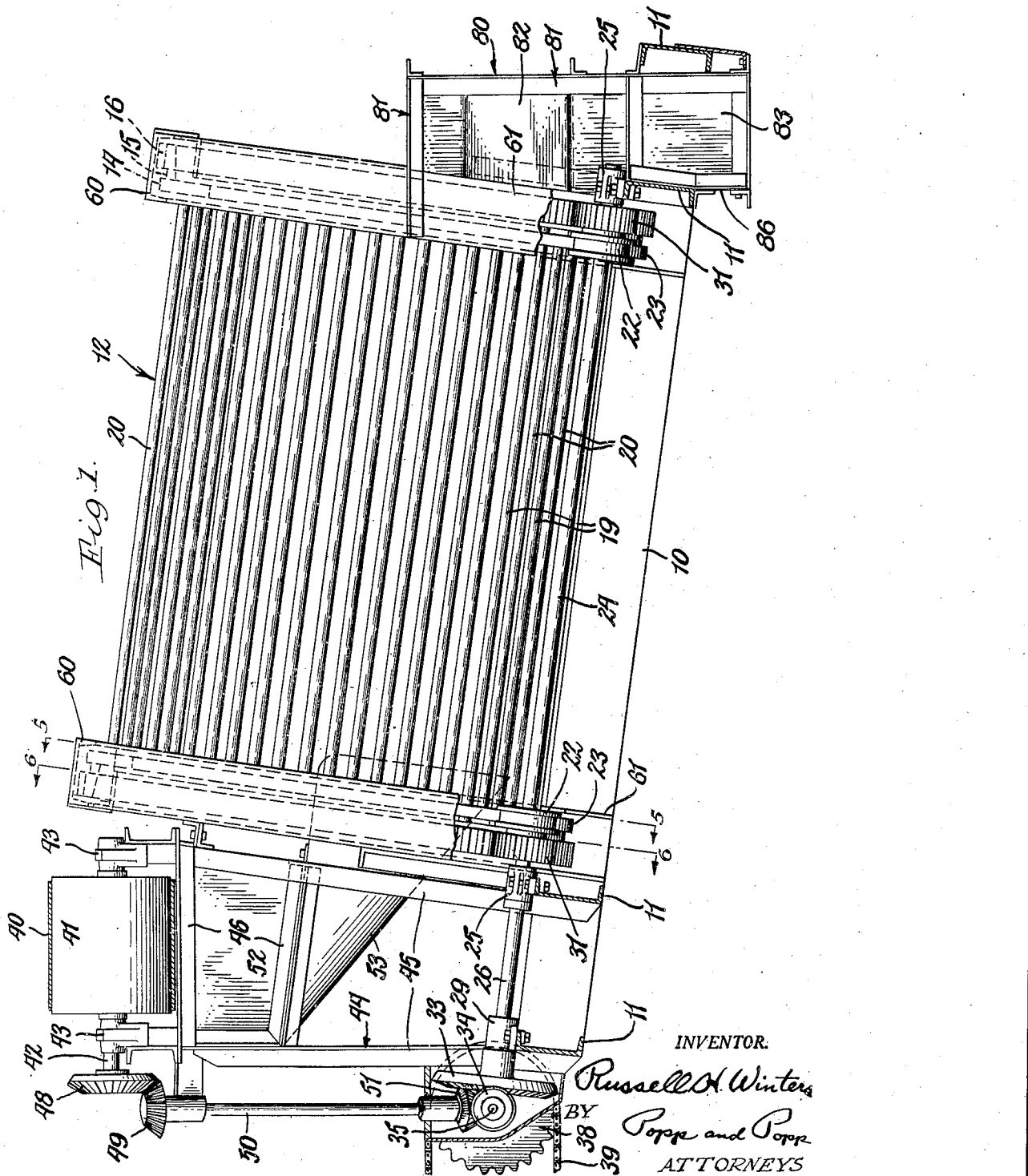
INVENTOR.
Russell H. Winters
BY
Popp and Popp
ATTORNEYS

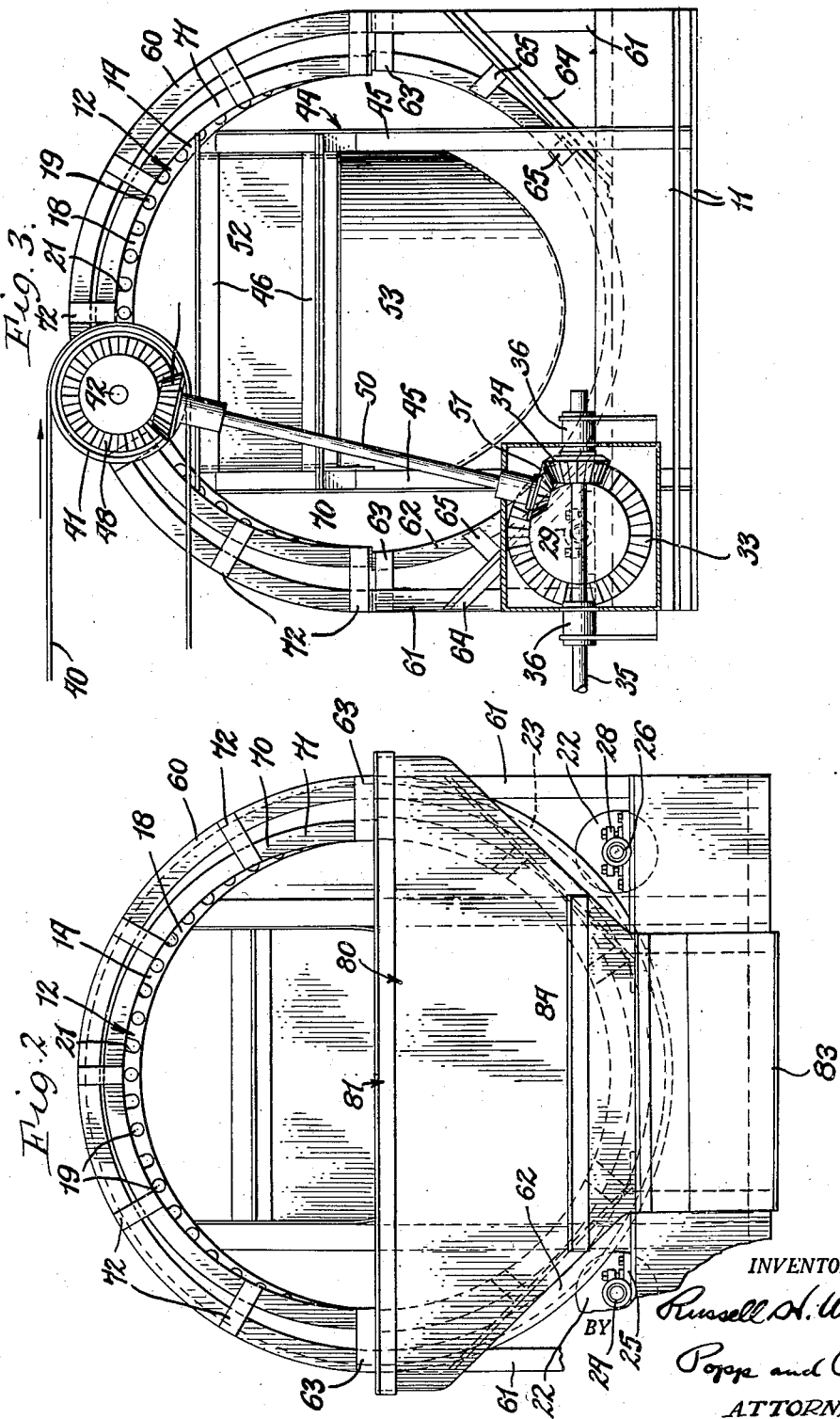

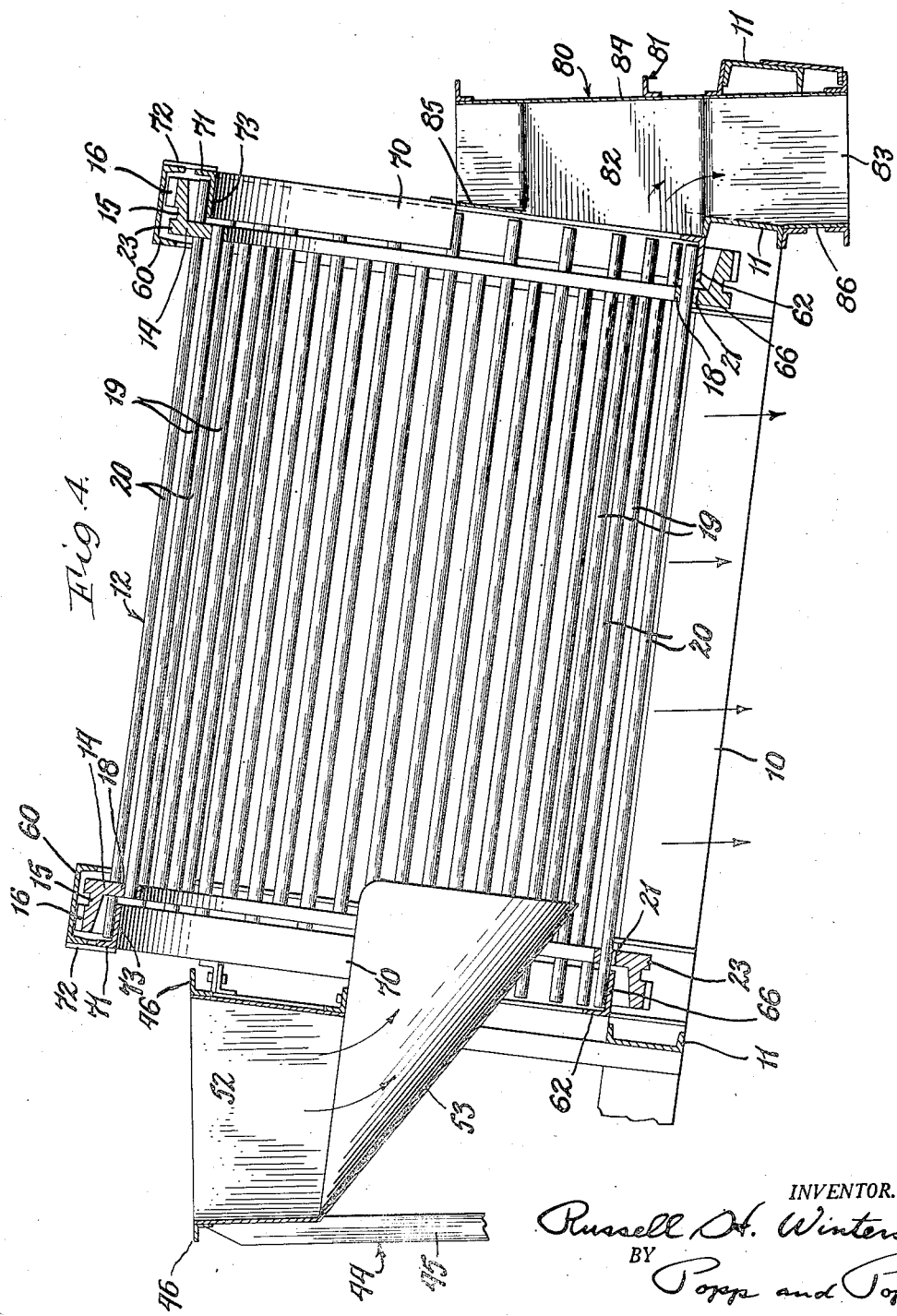

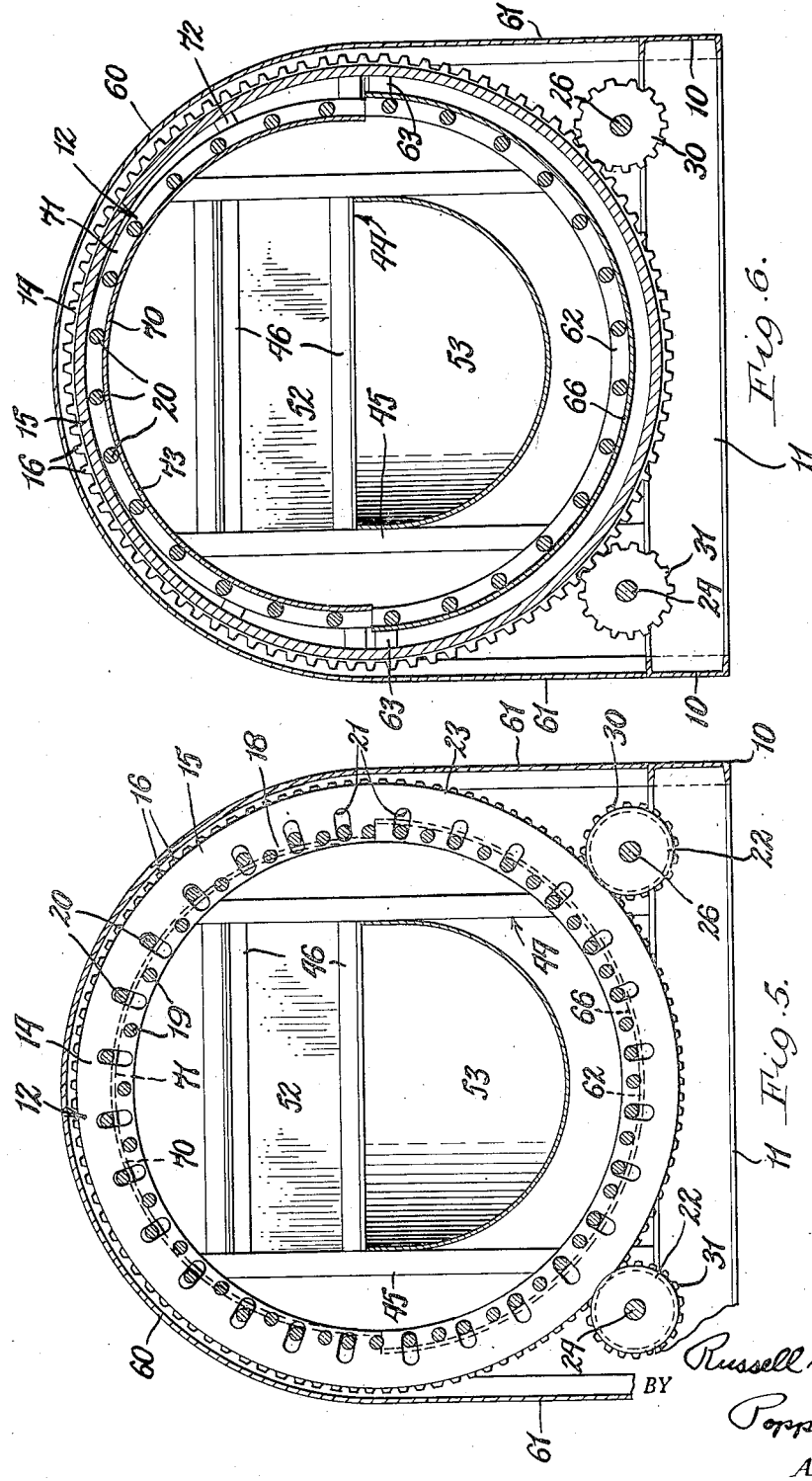

Patented Jan. 11, 1949

2,458,887

UNITED STATES PATENT OFFICE 2,458,887

BAR SCREEN GRADER FOR CARROTS AND VEGETABLES HAVING LIKE TAPERING FORMS

Russell H. Winters, Green Bay, Wis., assignor to The Larsen Company, Green Bay, Wis.

Application February 11, 1947, Serial No. 727,794

1 Claim. (Cl. 209—393)

This invention relates to a bar screen grader for carrots and vegetables having a like tapering form, such as corn on the cob, turnips, etc.

Because of the tapered form of carrots and similar tapered vegetables, carrots are difficult to grade as to size. With carrots and the like it is desirable to size grade them in a rotating cylindrical screen made up of circumferentially spaced longitudinal bars, the spacing of the bars determining the size of the carrots graded out by the screen, and the oversize carrots passing interiorally longitudinally over the bars and being discharged from the end of the screen. However, in such a cylindrical bar screen the smaller ends of many of the slightly larger or oversize carrots wedge between the bars and the following stream of carrots pound these caught carrots firmly between the bars. As a result, the cylindrical bar screen is soon clogged with these slightly oversize wedged carrots and must be stopped and the carrots removed laboriously by hand.

It is the principal object of the present invention to provide a size grader for carrots and like tapered vegetables which does not become clogged with such slightly oversize carrots.

Another object of the invention is to provide such a grader which is in the form of a simple cylindrical bar screen which handles a continuous stream of carrots and is therefore, of high capacity being operated with a minimum of abrasion on both the undersize and the oversize carrots.

Another object of the invention is to provide such a size grader which purges itself of slightly oversize wedged carrots thereby permitting continuous operation of the grader and eliminating the necessity for close supervision and periodic shutdown.

Another object of the invention is to provide such a size grader which can easily be cleaned and which is simple and inexpensive in construction.

Other objects and advantages will appear from the following description and drawings in which:

Fig. 1 is a side elevation, partly in section, on a size grader for carrots and the like embodying the present invention.

Fig. 2 is an end elevation thereof viewed from the discharge end of the grader.

Fig. 3 is an end elevation thereof viewed from the inlet end of the grader.

Fig. 4 is a vertical central longitudinal section through the grader forming the subject of the present invention.

Figs. 5 and 6 are vertical transverse sections taken on the correspondingly formed lines in Fig. 1.

The carrot grader is shown as mounted on a rectangular bed frame composed of two longitudinally side channels 10 connected by four cross channels 11, the latter being spaced to support the different elements as hereinafter described. This bed frame, composed of the channels 10, 11 is inclined, as best shown in Figs. 1 and 4 so as to slant from the inlet end downwardly toward its outlet end, this slant being provided to permit the stream of carrots to move by gravity lengthwise through a generally cylindrical bar screen mounted on this bed frame and which is indicated generally at 12.

This generally cylindrical bar screen 12 includes a pair of large end ring gears 14, 14, each of which is in the form of a large annular rim 15 having a series of external gear teeth 16 and having an inwardly extending annular flange 18 at one side, the two ring gears 14, 14 being arranged so that the flanges are in opposing relation to each other, as best illustrated in Fig. 4. The flanges 18 of the pair of gears 14, 14 are connected by a series of round bars 19, which extend through holes provided in the flanges and are fixed therein in any suitable manner. These fixed bars 19 constitute one series of the bars of the cylinder 12, the cylinder being provided with another series of bars, indicated at 20, which are arranged in alternate relation with the fixed bars 19. Each of the bars 20 is movable radially of the cylindrical bar screen and for this purpose each end of each of these bars 20 extends through a radial slot 21 provided in the corresponding gear 14. The movable bars 20 are also substantially longer than the fixed bars 19 and project longitudinally beyond the flange 18 of each of the gears 14, as best shown in Fig. 4.

The cylindrical bar screen is supported on four rollers 22 and for this purpose each of the gears 14 is formed with an outwardly projecting annular rib 23 which is preferably rectangular in cross section, these ribs being arranged in correspondingly shaped annular grooves provided in the peripheries of the rollers 22. A pair of these rollers 22 is arranged at each side of the cylindrical bar screen 12. At one side a corresponding pair of rollers is mounted on an idler shaft 24 which is journaled in bearings 25 provided on the main frame and on the opposite side of the bar screen the corresponding pair of rollers 22 is mounted on a drive shaft 26 which is also suitably journaled in bearings 28 on the bed frame, this drive shaft 26 being longer than the idler shaft 24 and being journaled at one end in a bearing 29 also carried by the bed frame. A pair of drive gears 30 are fixed to the drive shaft 26, each adjacent one of the rollers 22 carried by this drive shaft and in position to engage the teeth 16 of the corresponding gear 14. A similar pair of gears 31 is fast to the idler shaft 24, each adjacent a corresponding one of the rollers 22 carried by this idler shaft and meshing with the teeth 16 of the corresponding gear 14. It will therefore be seen that upon rotating the drive shaft 26 a corresponding rotation of the gears 14 is effected, this in turn rotating the idler shaft 24 through the gears 31 fast thereto. By the use of the gears 31 fast to the idler shaft 24, any tendency of the cylindrical bar screen 12 to twist about a longitudinal axis is prevented.

Any suitable means can be provided for rotating the drive shaft 26 to in turn rotate the cylindrical bar screen 12, the means shown comprising a bevel gear 33 fast to the drive shaft beyond the bearing 29 and meshing with a bevel pinion 34 fast to a main drive shaft 35, this drive shaft being shown as journaled in bearings 36 suitably mounted on the rectangular bed frame of the grader.

This main drive shaft 35 is shown as driven by a sprocket 38 fast thereto, which in turn is shown as driven through a chain 39 from any suitable source of power (not shown).

The carrots to be graded are fed into the elevated end of the cylindrical bar screen 12 and for this purpose are supplied from a conveyor belt 40 which passes around a roller 41 fast to a shaft 42 journaled in bearings 43. These bearings 43 are carried by a frame indicated generally at 44 arranged at the inlet end of the grading cylinder and shown as comprising four uprights 45 connected by cross members 46. The shaft 42 for the conveyor belt 40 is shown as driven through a bevel gear 48 which is fast to one end thereof and meshes with a bevel pinion 49 fast to the upper end of a generally vertical shaft 50, the lower end of the shaft having fast thereto a bevel gear 51 meshing with the main drive pinion 34, as best shown in Fig. 3.

The carrots on the upper stretch of the conveyor belt 40 are dropped into a hopper 52 having an inclined bottom or chute 53, the discharge end of which extends into the cylindrical bar 12 at the elevated end thereof. This hopper is supported by the frame 44.

The principal feature of the present invention resides in the manipulation of the radially movable bars 20 as these bars traverse the top of the cylindrical bar screen 12 to free any carrots which become jammed between adjacent bars 19, 20. For this purpose the upper half of each of the gears 14 is embraced and housed within the semi-cylindrical channel part 60, the opposite ends of this semi-cylindrical channel part 60 being extended downwardly to form vertical legs 61, the lower ends of which are suitably fixed to the rectangular bed frame of the grader. Each of these channel parts 60, 61 supports a track 62 in the form of an angle bar which is bent into semicircular form. For so supporting the semicircular angle bar 62 a pair of horizontal straps 63 are shown as welded to the upper ends of the legs 61 of each of the channels and as welded to the upper extremities of the radial flange of the corresponding semicircular angle bar 62. As additional support for each semicircular angle bar 62 a diagonal support 64 is shown as extending from each leg 61 to the bed frame and as carrying a plurality of welded straps 65 which are in turn welded to the radial flange of the semicircular angle bar 62. The axial flange 66 of each of the semicircular angle bars 62 extend in opposed relation to each other and are arranged concentric with the axis of rotation of the cylindrical bar screen 12. This flange is also arranged to engage the projecting ends of the radially movable screen bars 20 so as to hold these screen bars 20 at the inner ends of the slots 21 as they traverse the lower half of the cylindrical bar screen 12. These axial flanges of the semicircular angle bars 62 are further so arranged as to hold the radially movable screen bar 20 in the same circle as the fixed bars 19 of the screen, as best shown in Fig. 5, the projecting ends of the radially movable screen bars 20 riding along the inner face of the semicircular angle bar 62 for this purpose, as best shown in Figs. 4 and 6.

It will therefore be seen that while traversing the lower half of the cylindrical bar screen 12 the movable bars 20 are held in the same circle as the fixed bars 19 thereof and thereby are uniformly spaced to provide screening apertures of the desired width therebetween. However, when grading carrots or the like, the tapered ends of slightly oversize carrots pass into these apertures and become wedged between adjacent bars in the lower part of the cylindrical bar screen and these wedged carrots are carried around with the screen into the upper part thereof. To free such wedged slightly oversize carrots the movable bars 20 are moved radially outward in the radial slots 21 as they pass along the upper part of the cylindrical bar screen 12, this radial movement of these movable bars 21 increasing the spaces between each movable bar 20 and the two adjacent fixed bars 19 thereby to release the slightly oversize carrot. Since when freed the large end of the carrot is in a pendant position, the carrot drops back into the stream of carrots. In this manner the cylindrical screen is self-purging.

The means for so effecting radial movement of the bars 20 in the upper half of their circular course are preferably constructed as follows:

A semi-elliptical guide track 70, which is L-shaped in cross section, is arranged at each end of the cylindrical screen 12 and has its radially extending flange 71 secured to the corresponding semi-circular part 60 by a plurality of straps 72, or in any other suitable manner. The axially extending flanges 73 of these guide tracks 70 extend in opposed relation to each other and in position to engage the projecting ends of the radially movable bars 20 of the cylindrical bar screen 12. The opposite lower extremities of each of the guide tracks 70 are arranged in inwardly spaced relation to the ends of the axial flange 66 of the guide track 62 so that the projecting ends of the movable screen bars 20 on the rising side of the cylindrical bar screen 12 pass from engagement with the inner faces of the axial flanges 66 of the guide tracks 62 into engagement with the outer faces of the axial flanges 73 of the guide tracks 70. Conversely, on the descending side of the cylindrical bar screen 12, the projecting ends of the movable bars 20 pass from engagement with the outer faces of the axial flanges 73 of the semi-elliptical guide tracks 70 into engagement with the inner faces of the axial flanges 66 of the semicircular guide tracks 62. The guide track 70 is of semi-elliptical form with its salient part extending upwardly and this elliptical guide track 70 is proportioned so that as the movable bars approach the top of the cylindrical bar screen they are moved to the outer or upper extremities of the radial slots 21 by the axial flanges 73 of the semi-elliptical guide tracks 70. In so moving the spaces between each movable screen bar 20 and its adjacent fixed screen bars 19 is increased so as to release any carrot caught therebetween and permit it to fall back into the bottom of the cylindrical bar screen.

At the discharge end of the cylindrical bar screen 12 the oversize carrots fall into a hopper indicated generally at 80. This hopper can be of any suitable construction and it is shown as comprising a frame 81 of angle bars suitably secured to the bed frame and also to the legs 61 of the semi-circular angle bar 60 at the discharge end of the cylindrical bar screen. This framework supports side plates 82 which converge downwardly toward each other to provide a discharge chute 83 and a back plate 84, the front of this chute being open to the stream of carrots flowing from the bottom of the cylindrical bar screen 12. The upper and lower front parts of the hopper 80 and discharge chute 83 are shown as closed by front cross plates 85, 86.

Operation

In the operation of the size grader, a stream of carrots is continuously supplied to the upper stretch of the horizontal feed belt 40 which is moving in the direction of the arrow associated with Fig. 3. This stream of carrots is thereby discharged from this upper stretch of the feed belt 40 into the hopper 52. From the bottom of this feed hopper 52 this stream of carrots flows down the inclined chute 53 into the elevated end of the cylindrical bar screen 12.

This cylindrical bar screen is continuously rotated by its drive shaft 26 through the two pinions 30 thereon which mesh with the teeth 16 of the two large ring gears 14, 14 which form the opposite ends of the cylindrical bar screen. This drive shaft is driven through the bevel gear 33, bevel pinion 34, drive shaft 35, sprocket 38 and drive chain 39. The drive for the conveyor belt 40 is also from the bevel pinion 34, this being through the bevel pinion 51, shaft 52, bevel pinion 49 and bevel gear 48 fast to the drive shaft 42 for the pulley 41.

The cylindrical bar screen 12 is mounted for such rotation on the four rollers 22, and which engage and support the annular ribs 23 provided on the pair of large ring gears 14, 14. One pair of these rollers 22 is mounted on the drive shaft 26 and the other pair is mounted on an idler shaft 24, this idler shaft being journaled on the opposite side of the cylindrical bar screen 12 and also carrying a pair of gears 31 which mesh with the teeth 16 of the large ring gears 14, 14, thereby to prevent displacement of the cylindrical bar screen 12.

The cylindrical bar screen 12 is inclined as illustrated in Figs. 1 and 4 and the carrots thereby flow by gravity along the bottom of the cylindrical cage of spaced bars 19, 20 the spaces between which form the grading apertures for this cylindrical bar screen. At the bottom of the cylindrical bar screen these bars 19, 20 are in substantially semi-circular relation with each other, the movable bars 20 being held in this relation to the fixed bars 19 by the engagement of its projecting ends with the inner faces of the axial flanges 66 of the semi-circular guide tracks 62. On the rising side of the cylindrical bar screen 12 the projecting ends of these movable screen bars 20 pass from engagement with the inner faces of the axial flanges 66 of the semi-circular guide tracks 62 into engagement with the outer face of the axial flanges 73 of the semi-elliptical guide tracks 70. As the movable screen bars 20 continue along the rising side of the semi-elliptical guide tracks 70 they are moved toward the outer ends of their radial slots 21 by the upwardly salient form of these semi-elliptical guide tracks 70. In consequence, at the top of the cylindrical bar screen 12, the movable bars 20 are brought into zig-zag relation with the fixed bars 19, as best illustrated in Fig. 5. This, of course, greatly increases the spaces between the bars 19, 20 at the top of the cylindrical bar screen as compared with these spaces at the bottom of the cylindrical bar screen, as will be seen from an inspection of Fig. 5. In consequence, any slightly oversize carrots which have become wedged, particularly because of their tapered shape, between any of the bars 19, 20 while flowing along the bottom of the cylindrical bar screen will be released at the top of the cylindrical bar screen by this spreading or increased spacing of the bars 19, 20.

As the movable bars 20 traverse the descending side of the cylindrical bar screen 12, they are brought back into the more closely spaced grading relation required at the bottom of the screen. For this purpose, on the descending side of the cylindrical bar screen 12 the projecting ends of the movable bars 20 pass from engagement with the outer faces of the axial flanges 73 of the semi-elliptical guide tracks 70 into engagement with the inner faces of the axial flanges 66 of the semi-circular guide tracks 62. In this manner the movable bars 20 are brought back into the semi-circular relation with the fixed bars 19 to provide the uniform grading apertures at the bottom of the cylindrical bar screen.

The undersize carrots, together with dirt and small debris passes through the uniformly spaced apertures provided by the bars 19, 20 in the bottom of the cylindrical bar screen 12 and the oversize carrots work their way along the bars 19, 20 to the outlet or lower end of the cylindrical bar screen and fall into the hopper 80 from which they are discharged through the chute 83 at the lower end of this hopper.

From the foregoing it will be seen that the present invention provides a large capacity grader, particularly for tapered vegetables such as carrots, which is self-purging so as to avoid the necessity for shutdown or constant supervision in preventing blinding of the grader by carrots. It will further be seen that this self-purging is accomplished, in accordance with the present invention, in a very simple and expeditious manner and that the grader is free from operating difficulties.

I claim as my invention:

In a size grader for carrots and similar tapered vegetables, a cylindrical bar screen mounted for rotation about a generally horizontal axis and comprising a pair of end rings each having a series of radial slots near its periphery, a plurality of screen bars each having its opposite ends arranged in a corresponding pair of said slots on said end rings and thereby being supported generally in the form of a cylinder and generally parallel with said axis and capable of limited movement toward and from said axis, the opposite extremities of each of said screen bars projecting beyond said end rings, a pair of track bars of L-shaped cross section and of generally semicircular form each having a radially extending flange and an axially extending flange projecting from the outer edge of said radially extending flange, a stationary support holding each of said track bars alongside the lower part of each of said end rings with said axially extending flanges in opposed relation and engaging the sides of the passing screen bars to hold them in closely spaced relation as they traverse the lower part of said screen to provide minimum size grading apertures in the bottom of the screen, the said radial flanges preventing endwise displacement of said screen bars, a second pair of track bars of L-shaped cross section and of generally arching form and each having a radially extending flange and an axially extending flange projecting from the inner edge of said radially extending flange, a second stationary support holding each of said second track bars with its ends abutting the ends of one of said first track bars and with the radial flanges of both track bars forming a continuation of each other, said axially extending flanges of said second pair of track bars being in opposed relation to each other and spaced radially inwardly with reference to the axially extending flanges of said first pair of track bars and also engaging the sides of the ends of said screen bars, said second pair of track bars being arched to move the projecting extremities of said screen bars radially outwardly relative to said axis as they traverse the upper part of said screen to increase the size of said grading apertures and to release any carrots caught therein.

RUSSELL H. WINTERS.

REFERENCES CITED

The following references are of record in the file of this patent:

UNITED STATES PATENTS

| Number | Name | Date |
|---|---|---|
| 1,321,773 | Ross | Nov. 11, 1919 |
| 1,343,292 | Turner | June 15, 1920 |
| 1,703,591 | Olney | Feb. 26, 1929 |
| 2,241,977 | Buck | May 13, 1941 |